United States Patent
Singh et al.

(10) Patent No.: US 8,660,534 B2
(45) Date of Patent: *Feb. 25, 2014

(54) POLICY BASED CONTROLS FOR WIRELESS CAMERAS

(75) Inventors: Munindar P. Singh, Cary, NC (US); Mona Singh, Cary, NC (US)

(73) Assignee: Armstrong, Quinton Co. LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,034

(22) Filed: Jul. 2, 2012

(65) Prior Publication Data

US 2013/0002891 A1 Jan. 3, 2013

Related U.S. Application Data

(63) Continuation of application No. 12/957,858, filed on Dec. 1, 2010, now Pat. No. 8,238,879, which is a continuation of application No. 10/949,282, filed on Sep. 24, 2004, now Pat. No. 7,869,790.

(51) Int. Cl.
*H04M 1/66* (2006.01)

(52) U.S. Cl.
USPC ........... 455/411; 455/418; 455/419; 455/420; 709/220; 705/35

(58) Field of Classification Search
None
See application file for complete search history.

(56) References Cited

U.S. PATENT DOCUMENTS

| | | | |
|---|---|---|---|
| 5,715,487 A | 2/1998 | McIntyre et al. | |
| 6,011,973 A | 1/2000 | Valentine et al. | |
| 6,085,096 A | 7/2000 | Nakamura | |
| 6,233,448 B1 | 5/2001 | Alperovich et al. | |
| 6,256,503 B1 | 7/2001 | Stephens | |
| 6,421,544 B1 | 7/2002 | Sawada | |
| 6,522,352 B1 | 2/2003 | Strandwitz et al. | |
| 6,625,455 B1 | 9/2003 | Ariga | |
| 6,690,940 B1 | 2/2004 | Brown et al. | |
| 6,721,542 B1 | 4/2004 | Anttila et al. | |
| 6,738,572 B2 | 5/2004 | Hunter | |
| 6,823,199 B2 | 11/2004 | Gough | |
| 6,832,093 B1 | 12/2004 | Ranta | |
| 7,173,651 B1 | 2/2007 | Knowles | |
| 7,290,288 B2 | 10/2007 | Gregg et al. | |

(Continued)

FOREIGN PATENT DOCUMENTS

| | | | |
|---|---|---|---|
| JP | 2000333266 A | 11/2000 | |
| JP | 2004120530 A | 4/2004 | |

(Continued)

*Primary Examiner* — Justin Lee

(74) *Attorney, Agent, or Firm* — Novak Druce Connolly Bove + Quigg LLP

(57) ABSTRACT

A system and method provide parental and corporate control for a wireless camera. An administration authority web site is provided that enables an owner of a wireless camera to log into a server and establish a set of control policies that specify what actions on the phone are authorized for what user. The control policies are downloaded to the wireless camera, and the wireless camera is then operated such that a user of the wireless camera is only able to perform actions authorized by the control policies. In a further embodiment, a control policy is provided that requires the wireless camera to upload captured images to the server for review by the wireless camera owner. In addition, the images may be quarantined until the wireless camera owner authorizes their release to the user.

16 Claims, 2 Drawing Sheets

(56) References Cited

U.S. PATENT DOCUMENTS

| | | |
|---|---|---|
| 7,869,790 B2 * | 1/2011 | Singh et al. .................... 455/411 |
| 8,238,879 B2 * | 8/2012 | Singh et al. .................... 455/411 |
| 2001/0009855 A1 | 7/2001 | I'Anson |
| 2001/0051534 A1 | 12/2001 | Amin |
| 2002/0082002 A1 | 6/2002 | Fujii |
| 2002/0094805 A1 | 7/2002 | Yano et al. |
| 2002/0106202 A1 | 8/2002 | Hunter |
| 2002/0107032 A1 | 8/2002 | Agness et al. |
| 2002/0187818 A1 | 12/2002 | Kang |
| 2003/0078076 A1 | 4/2003 | Kuwajima et al. |
| 2003/0087631 A1 | 5/2003 | Diachina et al. |
| 2003/0134627 A1 | 7/2003 | Himmel et al. |
| 2003/0145228 A1 | 7/2003 | Suuronen et al. |
| 2004/0070670 A1 | 4/2004 | Foster |
| 2004/0087318 A1 | 5/2004 | Lipovski |
| 2004/0147255 A1 | 7/2004 | Lee |
| 2004/0166878 A1 | 8/2004 | Erskine et al. |
| 2004/0203842 A1 | 10/2004 | Hanninen et al. |
| 2004/0248597 A1 | 12/2004 | Mathis |
| 2004/0255048 A1 | 12/2004 | Lev Ran et al. |
| 2005/0007456 A1 | 1/2005 | Lee et al. |
| 2005/0064856 A1 | 3/2005 | Atkin et al. |
| 2005/0102167 A1 | 5/2005 | Kapoor |
| 2005/0192038 A1 | 9/2005 | Jeong |
| 2005/0256943 A1 | 11/2005 | Morris |
| 2006/0009265 A1 | 1/2006 | Clapper |
| 2006/0046746 A1 | 3/2006 | Ranford et al. |
| 2006/0069756 A1 | 3/2006 | Singh et al. |
| 2006/0094400 A1 | 5/2006 | Beachem et al. |
| 2006/0156385 A1 | 7/2006 | Chiviendacz et al. |
| 2006/0234678 A1 | 10/2006 | Juitt et al. |
| 2008/0043689 A1 | 2/2008 | Walter |
| 2008/0057977 A1 | 3/2008 | Shostak |
| 2009/0292543 A1 | 11/2009 | Anderson |

FOREIGN PATENT DOCUMENTS

| | | |
|---|---|---|
| WO | WO-9719255 A2 | 5/1997 |
| WO | WO-9800809 A1 | 1/1998 |
| WO | WO-00067204 A2 | 11/2000 |
| WO | WO-0167748 A1 | 9/2001 |
| WO | WO-0201864 A1 | 1/2002 |
| WO | WO-0254200 A2 | 7/2002 |
| WO | WO-2004029836 A2 | 4/2004 |

* cited by examiner

POLICY BASED CONTROLS FOR WIRELESS CAMERAS

CROSS-REFERENCE TO RELATED APPLICATIONS

This application is a Continuation application of co-pending U.S. patent application Ser. No. 12/957,858 filed Dec. 1, 2010, which is a continuation of U.S. patent application Ser. No. 10/949,282 filed Sep. 24, 2004 (now U.S. Pat. No. 7,869, 790), both entitled "Policy Based Controls for Wireless Cameras," which are commonly owned with this application and are herein incorporated by reference in their entireties.

FIELD OF THE INVENTION

The present invention relates to wireless cameras, and more particularly to a method and system for providing parental and corporate controls for wireless cameras.

BACKGROUND OF THE INVENTION

Cellular telephones equipped with cameras, camera-phones, are in widespread use today. Telephones (camera or otherwise) are designed to help their users. Thus, a design assumption is that the user can be fully trusted and is given full authority over the phone.

However, in many cases, the role of the phone user is different from the role of the phone owner or responsible party. Often the phones are given by an owner or more generally, any party that is responsible for the given phone, to some end user. For example, a parent may give a phone to a teenager, and a corporate or government manager may assign a phone to his or her employee. Sometimes camera-phones are misused or used in manners that are illegal, improper, or potentially embarrassing to the responsible party. Media attention has focused on cheating in exams and taking inappropriate pictures of other people. There could be a question of legal or financial liability for the responsible party. For example, a suburban family may be sued if their child is caught distributing the neighbor's pictures, or an insurance company could be sued and embarrassed if one of its adjusters is misusing his camera.

Although parental controls for TV and Internet sites exist for controlling access to content, there are no known specific techniques to manage the image content of a camera-phone. TV parental controls work by blocking television programming based upon its rating or by blocking certain channels. Internet controls work by blocking access to certain web content by restricting access to certain Internet sites. This is accomplished by either matching the names of the sites with selected key words or by looking up central registries (maintained by the product vendor or service provider) that have URLs for undesirable adult sites. Unfortunately, conventional parental control techniques cannot work for camera-phones because the content or subject matter of the pictures taken by the camera cannot be known ahead of time.

BRIEF SUMMARY OF THE INVENTION

Embodiments herein provide a method and system for providing parental control for a camera-phone. In an embodiment, an administration authority web site is provided that enables an owner of a cameraphone to log into a server and establish a set of control policies that specify what actions on the phone are authorized. The control policies are downloaded to the camera-phone, and the camera-phone is then operated such that a user of the camera-phone is only able to perform actions authorized by the control policies. In a further embodiment, a control policy is provided that requires the cameraphone to log the actions taken on the phone and to upload captured images to the server for review by the camera-phone owner. In addition, the images may be quarantined until the camera-phone owner authorizes their release to the user.

Embodiments of the method and system disclosed herein provide for control of the camera-phone without restricting the content of the images captured by deterring misuse of the phone through logging and quarantining procedures. When end-users of the camera-phone are made aware of the control policies, the logging and quarantine procedures act as a disincentive for the users take inappropriate pictures and/or to distribute the pictures to inappropriate people.

DETAILED DESCRIPTION OF THE INVENTION

Embodiments herein relate to providing parental and/or corporate control of a camera-phone. The following description is presented to enable one of ordinary skill in the art to make and use the invention and is provided in the context of a patent application and its requirements. Various modifications to the embodiments and the generic principles and features described herein will be readily apparent to those skilled in the art. Thus, the disclosure is not intended to be limited to the embodiments shown, but is to be accorded the widest scope consistent with the principles and features described herein.

Preventing misuse of camera-phones is a critical challenge in the expansion of this technology. Already there has been significant media attention on potential misuse. Parents and corporations in particular could also face liability from the misuse of phones that they assign to children or employees. Under public pressure, there might be requirements imposed by governments and other establishments such as schools and clubs about the kinds of camera-phones that are allowed. A method and system for providing parental and corporate controls for camera-phones are provided that significantly reduces the potential for camera-phone misuse.

Figure 1:
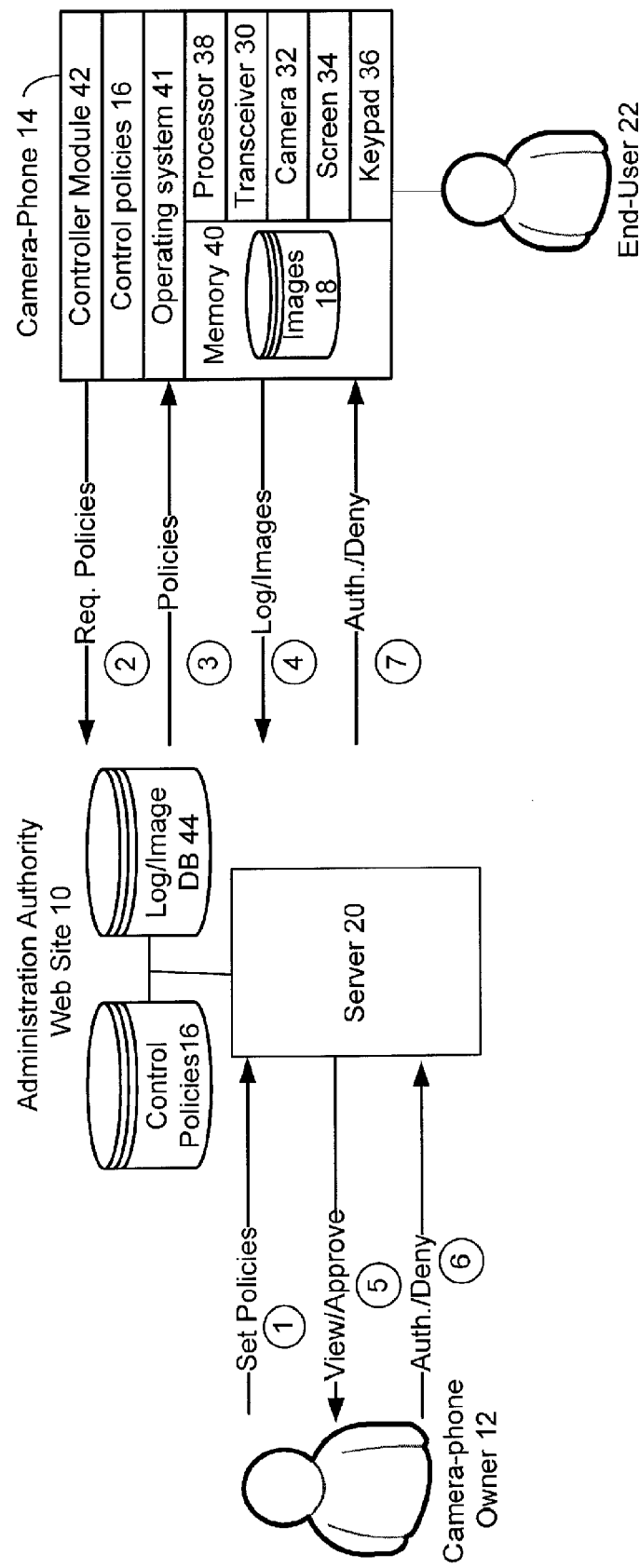
FIG. 1 is a block diagram illustrating a system for providing parental and corporate controls for camera-phones.

FIG. 1 is a block diagram illustrating a system for providing parental and corporate controls for camera-phones. An administration authority web site 10 is provided that enables an owner 12 of a camera-phone 14 to establish a set of rules or control policies 16 for controlling how the camera-phone 14 is used, such as requiring all images 18 captured by the phone 14 to be uploaded to a server 20 for review by the owner 12. In an embodiment, the control policies 16 may further include restricting access to the captures images 18 by an end-user 22 of the camera-phone 14 until authorization is given by the owner 12. When the camera-phone 14 is given to the end-user 22, the end-user 22 is preferably made aware of the applicable restrictions so they can make informed decisions about how he or she might attempt to use the phone 14.

In one embodiment, administration authority web site 10 is implemented by a cellular-phone service to offer a "protected" or "control" phone service to buyers of its camera-phones 14. The camera-phone 14 includes standard hardware and software for implementing functions of a cellular-phone and camera, such as a transceiver 30, a camera system 32, a display screen 34, keypad 36, processor 38, memory 40, and operating system 41. The camera-phone 14 can be configured to download the control policies 16 set by the camera owner 12, and is provided with controller module 42 that only allows a user of the camera-phone 14 to perform actions that are authorized by the control policies 16, as explained further below.

In operation, the camera owner 12 logs on to the administration authority server 20 to set or update the camera-phone control policies 16 via step 1. In an embodiment, this is accomplished by authenticating the camera-phone owner 12, such as with a userid and password, and displaying a web page showing all the camera-phones 14 associated with the camera-phone owner's account. The owner 12 may then choose the camera-phone(s) to configure. The above steps assume that an account has been established for the owner 12 after the owner 12 purchases the camera-phone 14 and the authentication web site 20 is provided with some unique identification of the camera-phone 14 (e.g. serial number). Each camera-phone 14 is associated with the camera-phone owner's account and may have its own control policies page that enables the cameraphone owner 12 to select what actions are allowed on the camera-phone 14 and/or what actions are restricted. In an alternative embodiment, the camera owner 12 may have subaccounts to which a group of camera-phones 14 or members of a group are associated. This allows the control policies 16 to be customized by subaccount or group. In addition, the control policies 16 may be configured such that policy enforcement is determined by parameters such as camera-phone 14 location, date and time of day, the particular end-user 22, and so on.

In an embodiment, the control policies 16 include settings for camera-phone action authorization/restriction, password authentication, logging policies, and quarantine policies. Each type of control policy is explained below.

Camera-Phone Action Authorization/Restriction. The control policies 16 include settings for authorizing or restricting actions/functions of the cameraphone 14. Examples of actions settings include allowing or disallowing the phone to take pictures altogether, restricting where or to whom the captured images may be sent, and so on. For example, a parent may forbid the use of the camera on the phone 14 when the phone is loaned to a teenager.

Password Authentication. Passwords are a common idea for computers and phones, however, according an embodiment, the control policies 16 may be configured to associate different password to different tasks, which are controlled remotely by the camera-phone owner 12 through the administration authority 10. Thus, the camera-phone owner 12 can enforce different policies, such as allowing no more than three pictures to be taken before the pictures are uploaded to the server 20 for review by the camera 12. The controller module 42 is responsible for keeping track of how many times pictures were taken in a session. When a phone is shared within a family or within a corporate group, and its users assigned his or her own password, the controller module 42 can record which user took the pictures, and some users may be allowed to take pictures when others are not.

Logging policies. Logging policies instruct the controller module 42 to log the actions taken on the camera-phone 14 and to periodically upload the log to the server 20 when access is available to the administrative authority 20. Logging policies mayor may not include the options of also uploading captured images 18 to the server 20. Logging actions in this manner is a more hands off approach to managing the misuse of the devices than password protection. Logging allows certain actions to be performed on the given device (otherwise, the device might as well not have the given capability). However, by logging the actions securely, it acts as a deterrent to potential misuses, because any violations they make can be detected later. Logging may be used not merely as an audit trail, but also as a prerequisite for certain actions on the camera-phone 14. In other words, a user cannot work around the restriction by preventing the phone from going online, but taking pictures with it while it is offline—this would prevent the log from becoming complete. The camera-phone owner 12 may specify in the control policies 16 that certain actions on the camera-phone 14 cannot be performed until the logging step is completed and acknowledged by the server 20. For example, a logging policy may specify that the end-user 22 cannot view or share the pictures he took until the images are logged with the server 20. In this manner, the camera-phone 14 can be used to take pictures even when it is off-line, but the pictures cannot be retrieved from it until the logging has been performed and acknowledged. In addition, well-known encryption-based methods can be employed in the camera-phone to store the pictures locally but not release them to the end user 22 until the logging succeeds.

Quarantine policies. Quarantine policies are similar to logging policies except that quarantine policies specify that all images 18 captured by the camera-phone 14 must be uploaded to the server 20, and that the images 18 must be approved by the camera owner or other designated authority before they are released for use. In this approach, images 18 remain in quarantine until the owner 12 or authority releases the images 18. This approach falls in between forbidding and merely logging actions. Quarantine policies require a human to review the images 18 on the remote server 20 to ensure that the pictures being viewed and shared are legitimate. This step clearly provides the best defense against misuse, because the images 18 cannot be distributed until they are approved by someone with the authority to do so. However, this step can be potentially time-consuming, especially if a person is responsible for managing several camera-phones. However, methods may be employed to improve the productivity of the reviewer(s). Specifically, the images 18 can be reviewed in batch, rather than one at a time. For example, pictures taken by a teenager could be reviewed every day by a parent (or upon request from the teenager); pictures taken by a corporate employee could be reviewed when the bundle they form is complete. For instance, when an insurance agent files his report for a claim, all pictures that he took related to that claim could be reviewed as part of the natural business workflow. Notice that the quarantine method changes the behavior of the users who might otherwise take inappropriate pictures. It acts as a disincentive for users to take such pictures; thus when the quarantine method is employed, almost all pictures will be appropriate. Consequently, the task of the reviewer will mostly be quite simple—just quickly review and accept the pictures. The interface for reviewing quarantined (or otherwise logged) pictures could be based on a web site or through email.

Referring still to FIG. 1, after the camera-phone 14 is given to the enduser 22 and the end-user 22 begins using the camera-phone 14, the cameraphone 14 connects to the server 20 through the controller module 42, and the controller module 42 periodically transmits a policy request to the server 20 via step 2. In response, the server 20 downloads the control policies 16 to the camera-phone 14 via step 3. In an embodiment, the control policies specify authorized and/or restricted actions, which actions, if any, require a password, and the required passwords. In an alternative embodiment, rather downloading all of the control policies 16 to the camera-phone 14, only a portion of the control policies 16 that affect the behavior of the camera-phone 14 are downloaded to the camera-phone 14. In this embodiment, the other control policies 16 would be enforced on the server 20.

As the end-user 22 uses the phone 14, various actions on the phone 14 are taken, which may include the capture of images 18. When the user instructs the phone 14 to perform an action, the controller module 42 checks whether the requested action is authorized by the control policies 16, and if so the action is performed by the camera-phone 14. If any passwords are required, the controller module 42 prompts the user for the password. If the requested action is not authorized or the password fails, the controller module 14 denies the phone's request to perform the action and notifies the end-user 22 either audibly or via a prompt on the display screen 34.

If the control policies 16 include a logging policy, the camera-phone 14 periodically uploads a log of the actions and optionally the captured images to the server 20 via step 4 for the purpose of allowing the camera owner 12 or designated authority to review the activities and pictures taken by the end-user of camera-phone 14. In an embodiment, the log and images are stored in a database 44 and associated with the camera owner's account 12. In step 5, the camera owner 12 accesses the server 20, logs into his or her account, and views the logs and/or pictures in the database 44 that were uploaded by the camera-phone 14. If the control policies 16 include a quarantine policy, then the camera owner 12 authorizes or denies the end-user 22 access or use of the images 18 via step 6. The camera owner's 12 response is sent to the camera phone via step 7.

In the case of a quarantine policy, the camera-phone 14 can be used for taking pictures in a disconnected mode, but the images 18 must be uploaded to the server 20 before they can be used. And the images 18 may be quarantined either on the camera-phone 14 or on the administration authority web site 10 until the owner 12 authorizes use of the images 16.

Note, the camera-phone owner 12 may set/update the control policies 16 on the server 20 either before, during, or after the end-user 22 is provided with the camera-phone 14. Because the controller module 42 on the phone 14 checks with the web site 20, the camera-phone owner 12 can modify the behavior of the phone as desired, e.g., by turning off the ability to take pictures (or email pictures) even when the camera-phone is not physically in the possession of the owner 12. This enables the camera-phone owner 12 to set restrictions on the camera-phone 14 dynamically and in response to how the end-user 22 is utilizing the camera-phone 14. Thus, privileges on the cameraphone 14 can be awarded and withdrawn by the camera-phone owner 12 as needed.

Figure 2:
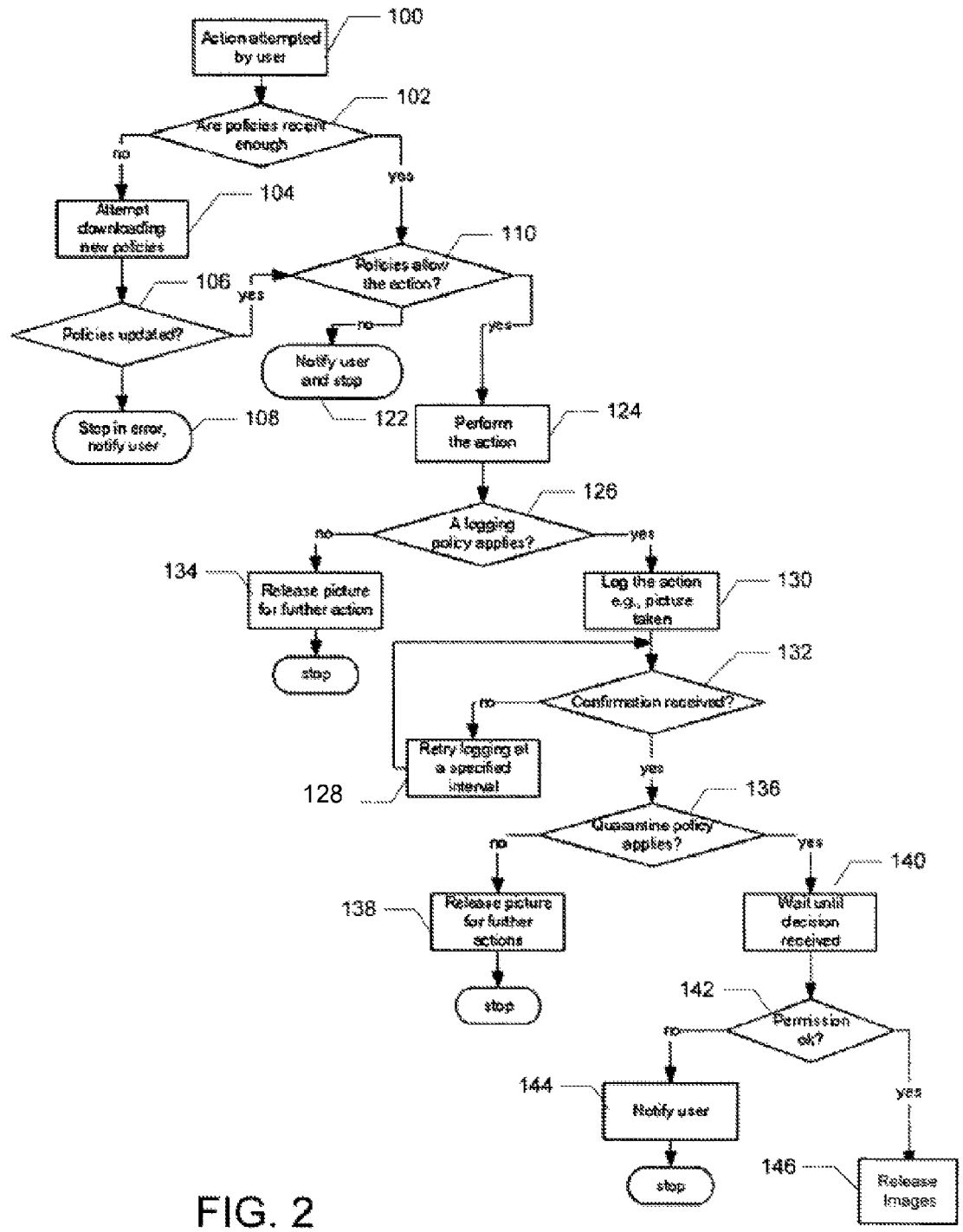
FIG. 2 is a flow diagram illustrating the process performed by a controller module for providing parental and corporate controls for the camera-phone in accordance with an embodiment of the present invention.

FIG. 2 is a flow diagram illustrating the process for providing parental and corporate controls for the camera-phone 14 performed by the controller module 42 in accordance with an embodiment. The process begins in step 100 when an action is attempted by the end-user 22 during operation of the camera-phone 14. In step 102, the controller module 42 determines if the control policies 16 are sufficiently recent. In one embodiment, a parameter in the control policies 16 may control how often the controller module 42 requests the control policies 16 from the server 20. Alternatively, the server 20 may be configured to automatically push the control policies 16 to the cameraphone 14 whenever an update is available and the camera-phone 14 is online.

If the control policies are not sufficiently recent, then in step 104 the controller module 42 requests and downloads the control policies 16 from the server 20. If the control policies 16 are not updated after the download in step 106, then the controller module 42 notifies the user of the error in step 108. If the control policies 16 update correctly, then the controller module 42 in step 110 determines if the control policies 16 allow the action attempted by the end-user 22. If the control policies 16 do not authorized the action, then the step 122 the controller module 42 prevents the camera-phone 14 from performing the action and notifies the user 22. If the control policies 16 authorize the action, the camera-phone 14 performs the action (e.g. capture image) in step 124.

In step 126, the controller module 42 determines if the control policies 16 include a logging policy. If not, in step 128 the controller module 42 releases the image for further action. If there is a logging policy, in step 130 the controller module 42 logs the action taken by the camera-phone 14 and uploads the log to the server 20. Besides the action, the log may also include the time the action was taken, and the settings of the camera-phone 14 at the time. In addition, the log may also include the captured image if the control policies 16 require that captured images 18 be uploaded as part of the log.

In step 132, the control module 42 determines if the confirmation was received from the server 20. If not, in step 134 the controller module 42 retries logging at specified intervals. Until confirmation is received, the control policies may specify a set of restricted actions. Once confirmation is received, the controller module 42 determines if the control policies 16 include a quarantine policy in step 136. If not, then in step 138 the controller module 42 releases the captured image for further action. If there is a quarantine policy, then in step 140, the controller module 42 restricts access to the image until a decision from the camera-phone owner 12 is received. If the decision received from the camera-phone owner does not authorize the image in step 142, then in step 144 the control module 42 notifies the user. If the decision received from the cameraphone owner 12 does authorize the image, then in step 146 the controller module 42 releases the image.

A method and system for providing parental and corporate control for camera-phone has been disclosed. One of ordinary skill in the art will readily recognize that there could be variations to the embodiments, and any variations would be within the spirit and scope of the present invention. For example, the term camera-phone includes any portable device having wireless communication and the ability to capture digital images, such as digital still and video cameras, and PDA's, for instance. And rather than uploading one logged action and/or image at a time to the server 20, as shown in FIG. 1, the controller module 42 can be configured to upload logged actions and captured images 18 in batch (e.g., uploading images that were captured while the camera-phone was off-line when the camera-phone becomes online). In addition, embodiments have been described in terms of a camera-phone owner 12, the term camera-phone owner is intended to include the camera-phone owner's representatives and designated authorities. Accordingly, many modifications may be made by one of ordinary skill in the art without departing from the spirit and scope of the appended claims.

We claim:

1. A method for providing policy-based control for wireless cameras, comprising:

storing a control policy for a wireless camera at a server, the control policy specifying that the wireless camera is required to upload captured images to the server as a prerequisite to performing at least some further actions at the wireless camera;

providing the control policy to the wireless camera; and receiving captured images at the server that are uploaded according to the control policy.

2. The method of claim 1, wherein the control policy specifies that the wireless camera is required to upload captured images to the server as a prerequisite to viewing the captured images on the camera.

3. The method of claim 1, wherein the control policy specifies that the wireless camera is required to (a) encrypt captured images and (b) upload captured images to the server as a prerequisite to decrypting the captured images.

4. The method of claim 1, wherein the control policy specifies that the wireless camera is required to upload captured images to the server as a prerequisite to the camera sharing the captured images with picture viewing devices other than the server.

5. A computing system for providing policy-based control for wireless cameras, comprising:

at least one processor; and memory including instructions that, in response to execution by the at least one processor, cause the computing system to:

store a control policy for a wireless camera at a server, the control policy specifying that the wireless camera is required to upload captured images to the server as a prerequisite to performing at least some further actions at the wireless camera;

provide the control policy to the wireless camera; and receive captured images at the server that are uploaded according to the control policy.

6. The system of claim 5, wherein the control policy specifies that the wireless camera is required to upload captured images to the server as a prerequisite to viewing the captured images on the camera.

7. The system of claim 6, wherein the control policy specifies that the wireless camera is required to (a) encrypt captured images and (b) upload captured images to the server as a prerequisite to decrypting the captured images.

8. The system of claim 5, wherein the control policy specifies that the wireless camera is required to upload captured images to the server as a prerequisite to the camera sharing the captured images with picture viewing devices other than the server.

9. A non-transitory computer readable storage medium storing one or more sequences of instructions executed by one or more processors to cause the one or more processors to:

store a control policy for a wireless camera at a server, the control policy specifying that the wireless camera is required to upload captured images to the server as a prerequisite to performing at least some further actions at the wireless camera;

provide the control policy to the wireless camera; and receive captured images at the server that are uploaded according to the control policy.

10. The system of claim 9, wherein the control policy specifies that the wireless camera is required to upload captured images to the server as a prerequisite to viewing the captured images on the camera.

11. The system of claim 10, wherein the control policy specifies that the wireless camera is required to (a) encrypt captured images and (b) upload captured images to the server as a prerequisite to decrypting the captured images.

12. The system of claim 9, wherein the control policy specifies that the wireless camera is required to upload captured images to the server as a prerequisite to the camera sharing the captured images with picture viewing devices other than the server.

13. A system for providing policy-based control for wireless cameras, comprising:

means for storing a control policy for a wireless camera at a server, the control policy specifying that the wireless camera is required to upload captured images to the server as a prerequisite to performing at least some further actions at the wireless camera;

means for providing the control policy to the wireless camera; and means for receiving captured images at the server that are uploaded according to the control policy.

14. The system of claim 13, wherein the control policy specifies that the wireless camera is required to upload captured images to the server as a prerequisite to viewing the captured images on the camera.

15. The system of claim 14, wherein the control policy specifies that the wireless camera is required to (a) encrypt captured images and (b) upload captured images to the server as a prerequisite to decrypting the captured images.

16. The system of claim 13, wherein the control policy specifies that the wireless camera is required to upload captured images to the server as a prerequisite to the camera sharing the captured images with picture viewing devices other than the server.

* * * * *